US005198054A

United States Patent [19]

Drake et al.

[11] Patent Number: 5,198,054

[45] Date of Patent: Mar. 30, 1993

[54] METHOD OF MAKING COMPENSATED COLLINEAR READING OR WRITING BAR ARRAYS ASSEMBLED FROM SUBUNITS

[75] Inventors: Donald J. Drake, Rochester; Peter J. Nystrom, Webster, both of N.Y.

[73] Assignee: Xerox Corporation, Stamford, Conn.

[21] Appl. No.: 743,647

[22] Filed: Aug. 12, 1991

[51] Int. Cl.[5] .......... B32B 31/00

[52] U.S. Cl. .......... 156/64; 156/299; 156/300; 29/890.1; 29/407

[58] Field of Search .......... 156/64, 300, 299, 297; 29/593, 890.1, 423, 467, 831, 833, 740, 407

[56] References Cited

U.S. PATENT DOCUMENTS

| | | | |
|---|---|---|---|
| Re. 32,572 | 1/1988 | Hawkins et al. | 156/626 |
| 4,759,675 | 7/1988 | Bond et al. | 414/222 |
| 4,774,530 | 9/1988 | Hawkins | 346/140 R |
| 4,822,755 | 4/1989 | Hawkins et al. | 437/227 |
| 4,829,324 | 5/1989 | Drake et al. | 346/140 R |
| 4,911,598 | 3/1990 | Sarvary et al. | 414/225 |
| 4,943,328 | 7/1990 | Quick | 156/64 |
| 4,980,971 | 1/1991 | Bartschat et al. | 29/833 |
| 4,999,077 | 3/1991 | Drake et al. | 156/299 |
| 5,005,277 | 4/1991 | Uemura et al. | 29/407 |

*Primary Examiner*—David A. Simmons
*Assistant Examiner*—Chester T. Barry
*Attorney, Agent, or Firm*—Robert A. Chittum

[57] ABSTRACT

A fabricating process for pagewidth reading and/or writing bars assembled from subunits, such as ink jet printhead subunits, is disclosed. At least two lengths of subunits are cut and placed on corresponding flat containers. An assembly robot places the subunits in a butted array on an alignment fixture and checks the accumulated positional error of the subunits as they are being assembled. When the robot detects an error exceeding some preset limits, it chooses a subunit of a known size to compensate for the detected error.

23 Claims, 5 Drawing Sheets

METHOD OF MAKING COMPENSATED COLLINEAR READING OR WRITING BAR ARRAYS ASSEMBLED FROM SUBUNITS

BACKGROUND OF THE INVENTION

1. Field of the Invention

This invention relates generally to the fabrication of pagewidth reading or writing bars, and more particularly to the fabrication process for a pagewidth linear array of reading or writing bars from subunits, so that tolerance stackup is avoided. By example, illustration of the specific details of the invention will be provided for a pagewidth thermal ink jet printhead array fabricated from fully functional subunits.

2. Description of the Prior Art

It is well known in the reading and/or writing bar industry to assemble pagewidth raster input scanning (RIS) and raster output scanning (ROS) bars from relatively short RIS/ROS subunits placed end-to-end. Once assembled, the pagewidth RIS/ROS bars or reading and writing bar arrays have the requisite length and number of image processing elements to scan or to write an entire line of information at once with a high image resolution. The subunits have either image reading arrays which comprise a succession of image sensing elements to convert the image line into electrical signals or pixels, or image writing arrays which comprise a succession of light producing or other elements employed to produce images in response to an image signal or pixel input.

The prior art has failed to provide a means for fabricating a pagewidth scanning or writing bar array from subunits which has adequate precise alignment tolerance in X, Y, and ⊖ space which is commercially (i.e. economically) feasible. The prior art solutions to overcome this inability to provide cost effective pagewidth reading or writing bar arrays include optical and electrical arrangements for overlapping several short arrays and abutting short arrays together end-to-end. However, none of these attempts have met with any great degree of success. For example, in the case of abutting smaller arrays together, losses and distortions of the pagewidth image often occurs because of the inability to achieve exact alignment of the smaller arrays with respect to each other. Another important problem with simply abutting chips or subunits is that chip or subunit width errors accumulate over the length of the pagewidth array.

In particular, thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it towards a recording medium. The use of an array of printhead subunits is appropriate because pagewidth printheads cannot be practically fabricated on a single wafer. Full width printbars composed of collinear arrays of thermal ink jet printhead subunits have a number of architectural advantages over staggered offset printbar architecture. One convenient method of fabricating a collinear subunit printbar is to simply butt each printhead subunit up against its neighboring printhead subunit. This fabrication method provides very positive positioning of the printhead subunits and minimizes the nozzle gap between adjacent printhead subunits, but does not prevent tolerance stackup as the pagewidth device is fabricated.

U.S. Pat. No. Re.32,572 to Hawkins et al. discloses several methods for fabricating small ink jet printheads, each printhead being composed of two parts aligned and bonded together. One part is a silicon wafer having a substantially flat substrate with a surface containing a linear array of heating elements and addressing electrodes, and the second part is another silicon wafer having a substrate containing at least one recess anisotropically etched therein to serve as an ink supply manifold when the two parts are bonded together and a linear array of parallel grooves which communicate with the recess and are used as ink jet nozzles. After the bonding, the two wafers are diced into many different printheads with nozzles located in the printhead sides. A number of printheads can then be fixedly mounted in a pagewidth configuration which confronts a moving recording medium for pagewidth printing.

U.S. Pat. No. 4,789,425 to Drake et al. discloses a process for fabricating small ink jet printheads with nozzles located in the printhead roofs.

U.S. Pat. No. 4,774,530 to Hawkins discloses a thick insulative layer sandwiched between the two wafers of the printhead with recesses patterned in it to expose the heating elements to the ink and to provide a flow path for the ink from the manifold to the channels by enabling the ink to flow around the closed ends of the channels.

U.S. Pat. No. 4,759,675 to Bond et al. discloses an apparatus for removing selected integrated die from a wafer array which sequentially moves above the wafer and knocks down die from the array of die into a receptacle for further processing.

U.S. Pat. No. 4,829,324 to Drake et al. discloses a large array ink jet printhead fabrication process for precision assembly with subunits. One embodiment involves abutting edges of subunits having surfaces which follow the {111} planes of a silicon wafer from which they are produced. Another embodiment is disclosed in which, before dicing and abutting, an etched silicon channel wafer is aligned and bonded to an etched silicon heater wafer so that the {111} plane surface of the channel wafer is coplanar with the {111} plane surface of the heater wafer groove.

U.S. Pat. No. 4,822,755 to Hawkins et al., U.S. Pat. No. 4,900,283 to Fukae, and U.S. Pat. No. 4,976,802 to LeBlanc disclose processes for bonding subunits into arrays.

U.S. Pat. No. 4,911,598 to Sarvary et al. discloses a robotic assembly apparatus that places component parts on a workpiece.

U.S. Pat. No. 4,999,077 to Drake et al. discloses a method for fabricating a coplanar full width scanning array from a plurality of relatively short scanning subunits for reading and writing images. The subunits are fixedly mounted in an end-to-end relationship on a flat structural member with the subunit surfaces containing the scanning elements all being coplanar even though at least some of the subunits have varying thickness. This is accomplished by forming from a photopatternable thick film layer one or more keys on the subunit surface having the scanning elements and associated circuitry and positioning the keys into keyways produced from a photopatternable thick film layer on a flat surface of an alignment fixture. A conformal adhesive bonds a structural member to the assembled subunits to form the full width scanning array.

U.S. Pat. No. 4,980,971 to Bartschat et al. discloses a method and apparatus for precision semiconductor chip placement on a silicon substrate including a robotic arm. A television camera is carried by the arm and serves to capture the image of a substrate to locate datum positions. A second camera, stationary with respect to the robotic arm, captures the image of a chip by observing its bottom. A machine vision system processes output signals from the cameras, precisely locates the different types of chips, and controls the robotic arm. Each chip is placed in its precise location of the integrated circuit. The Bartschat et al. patent does not involve abutting subunits or arrays.

A significant drawback to butted arrays of collinear printheads is the effect of tolerance stackup on multiple bar systems. For example, if a series of printhead modules to be butted together are all slightly undersized by two microns, then twenty of these butted modules will result in a printbar that is 40 microns undersized. When multiple pagewidth printbars are to be aligned, as is necessary for a four bar color machine, such an undersized amount is unacceptable. If the droplet ejecting nozzles of the bars are not properly aligned, then the second color droplets from the second bar will not line up with the first color droplets from the first bar and the final image will not properly blend. This is a problem always encountered where multiple pagewidth bars or arrays are each assembled from subunits and used in the field of reading and/or writing bars. This is especially a problem for pagewidth multicolor ink jet printheads assembled from subunits, where droplets of one printhead must align within a given tolerance with the droplets from one or more other printheads.

SUMMARY OF THE INVENTION

An object of the present invention is to provide a large array fabrication process that will permit precision assembly of large arrays of reading and/or writing bars and, in particular, of thermal ink jet printheads.

One embodiment of the present invention is a method for fabricating a pagewidth linear array for use as a pixel reading and/or writing bar assembled by the end-to-end abutment of fully functional subunits. Each subunit has a plurality of equally spaced, linearly arranged discrete reading and/or writing elements. Two or more separate supplies of substantially identical fully functional subunits are provided. Each subunit in each supply has opposing ends adopted for abutment with each other and the subunits in each of the supplies are substantially identical. The subunits of one supply are identical with the subunits of the other supplies except for differing predetermined lengths. The predetermined length of subunits from the supply of shorter subunits may be referred to as the shorter predetermined length while the predetermined length of subunits from the supply of longer subunits may be referred to as the longer predetermined length. Subunits from a predetermined one of the supplies of subunits are mounted one at a time on an alignment fixture in an end-to-end abutting relationship. The distance of a registration point, preferably the last element of the last mounted subunit, from a location point, preferably one reference point or contacting surface of the alignment fixture, is determined and compared to a desired distance. Subunits from the same supply as the first mounted subunit are used until the difference between the actual linear distance between the location point and the registration point is above or below a predetermined amount, at which event a subunit from a different supply is selected for mounting, depending upon the tolerance buildup. The steps of using predetermined subunits as standard ones until the tolerance is exceeded and then using an appropriately sized shorter or longer subunit from the other supplies are repeated until the pagewidth linear array is completed with a final subunit that is within the desired overall dimension.

In another embodiment of the present invention, a method for fabricating a pagewidth linear array for use as a printbar is described. The bar is assembled by the end-to-end abutment of fully functional printhead subunits, each subunit having a plurality of equally spaced, linearly arranged droplet ejecting nozzles. At least one supply of substantially identical fully functional longer printhead subunits, each having opposing ends adopted for abutment with each other is provided, the distance between opposing ends of each printhead subunit being within a predetermined distance plus or minus a predetermined tolerance, so that the distance between adjacent end nozzles in two separately abutted printhead subunits is within the same spacing as the nozzles in the printhead subunits plus or minus the predetermined tolerance. At least one supply of fully functional shorter printhead subunits is provided. These shorter printhead subunits are substantially identical to the longer printhead subunits, except that the distance between opposing ends is slightly smaller than the distance between the opposing ends of the longer printhead subunits by a predetermined amount. A first printhead subunit from any of the supplies is mounted. Printhead subunits from the same supply as the first printhead subunit are mounted one at a time on the alignment fixture in an end-to-end abutting relationship. The distance of a registration point, preferably the last nozzle of a last mounted printhead subunit, from a location point, preferably one reference point or contacting surface of the alignment fixture, is monitored before a next printhead subunit is mounted. Only printhead subunits from the same supply as the first printhead subunit are used until the distance separating the location point and the registration point is outside an acceptable predetermined range. Any situation in which the distance is outside the range is corrected by either replacing the last mounted printhead subunit or by choosing the printhead subunit to be mounted next from another supply of subunits. The end-to-end abutment of the subunits on the fixture, followed by measuring the last nozzle of the last mounted printhead subunit from the location point, is continued until the pagewidth printbar is completed with a final subunit that is within the desired overall dimension.

A more complete understanding of the present invention can be obtained by considering the following detailed description in conjunction with the accompanying drawings wherein like index numerals indicate like parts.

BRIEF DESCRIPTION OF THE DRAWINGS

Although the invention has general application in the field of reading and/or writing bars, it will be more specifically described, by way of example, with reference to thermal ink jet technology and the accompanying drawings.

DESCRIPTION OF THE PREFERRED EMBODIMENT

Figure 1:
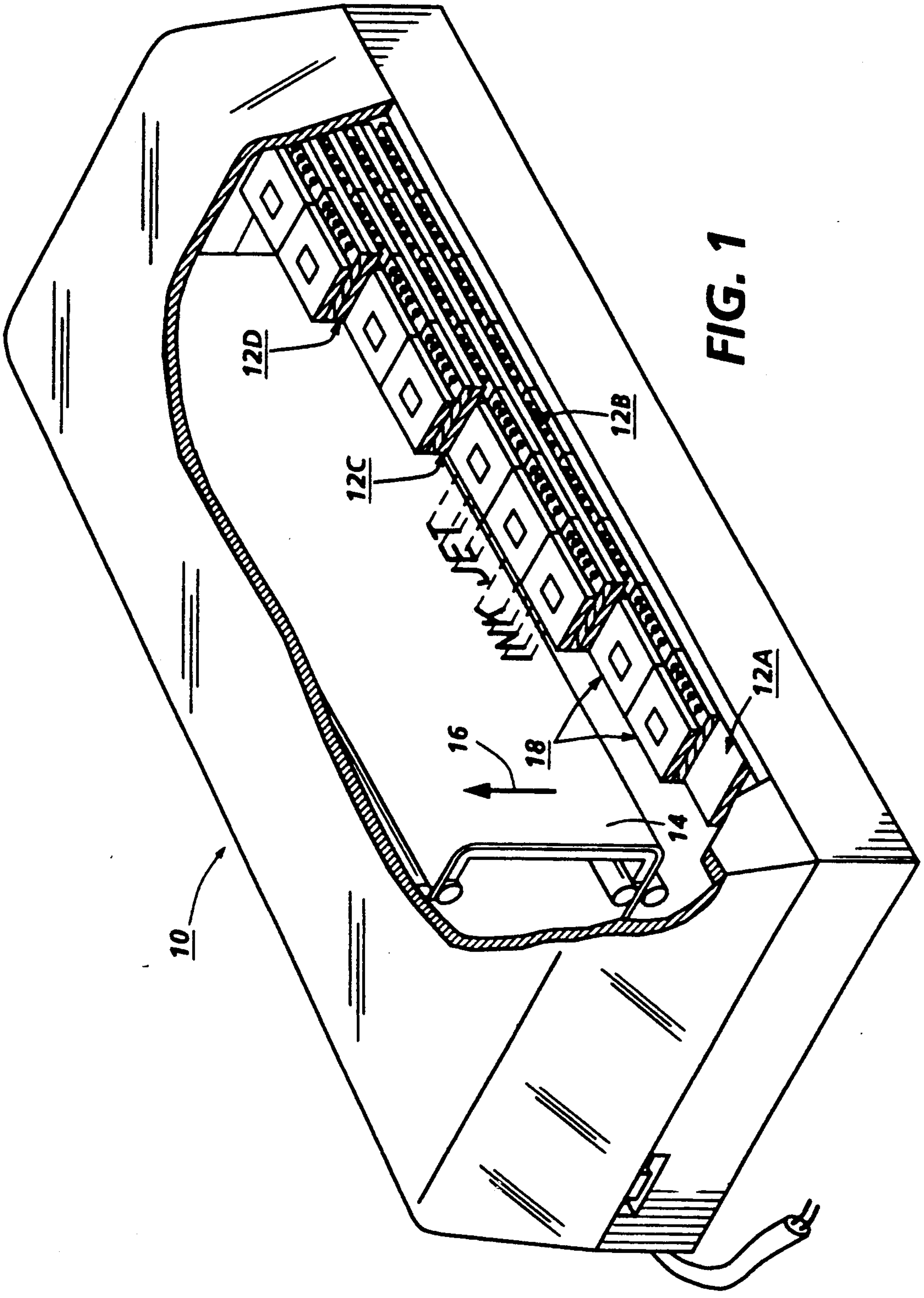
FIG. 1 is a schematic isometric view of a multicolor, pagewidth type thermal ink jet printer having four pagewidth printbars each fabricated from sideshooter type printhead subunits in accordance with the present invention.

FIG. 1 is a schematic isometric view of a pagewidth type, multicolor, thermal ink jet printer 10. In general, a pagewidth monochrome printer has a stationary printbar 12A having a length equal to or greater than the length of the paper 14. A multicolor pagewidth printer has four stationary printbars 12A, 12B, 12C, 12D stacked one over the other, with the side nozzles of each printbar in alignment with each other. The paper is continually moved past the pagewidth printbars in the direction of arrow 16, a direction normal to the printbar length and at a constant speed during the printing process. Refer to U.S. Pat. Nos. 4,463,359 to Ayata et al. and 4,829,324 to Drake et al. for examples of pagewidth printing.

Figure 2:
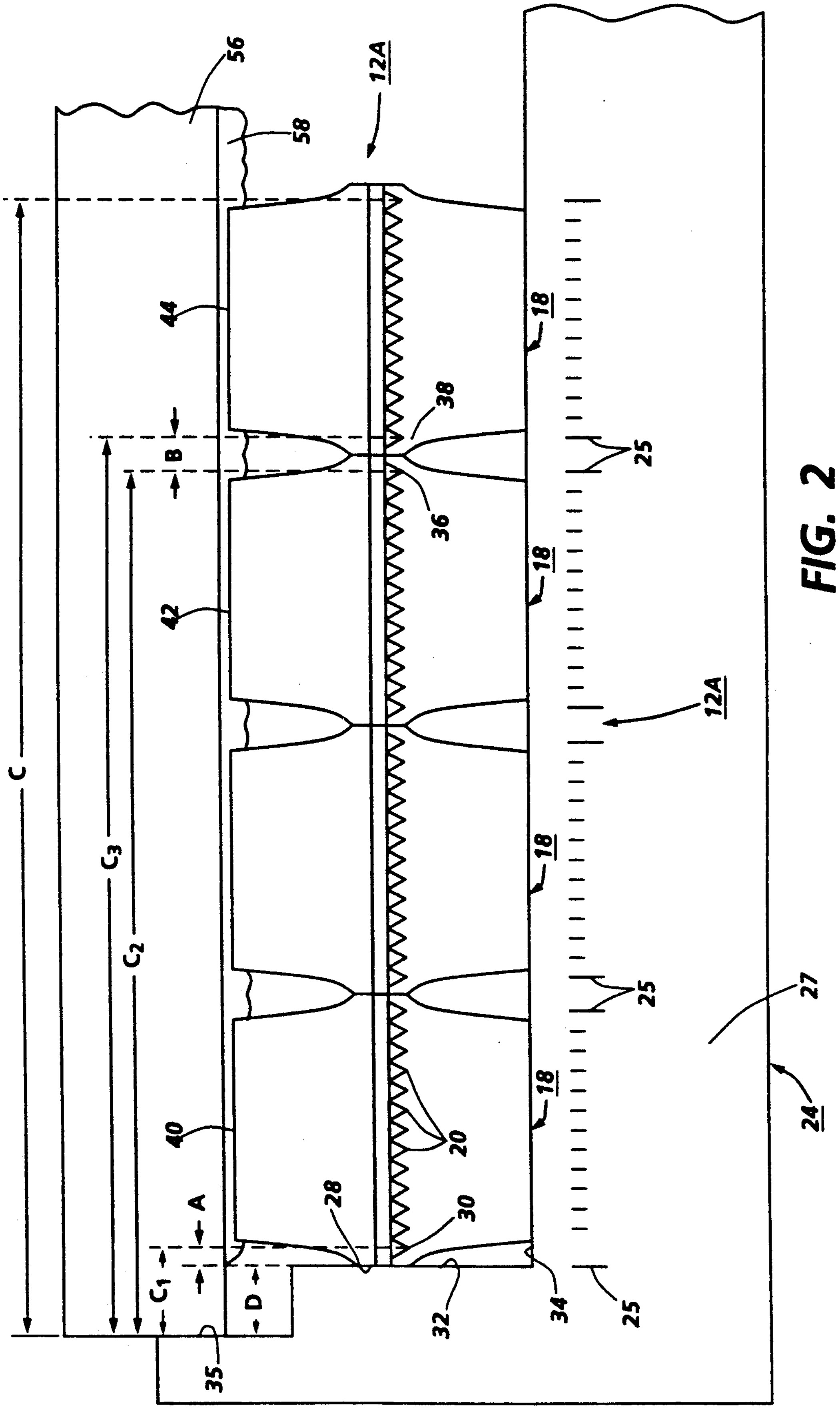
FIG. 2 is an enlarged, partially shown front view of one of the printbars of FIG. 1 in an assembly fixture.
Figure 3:
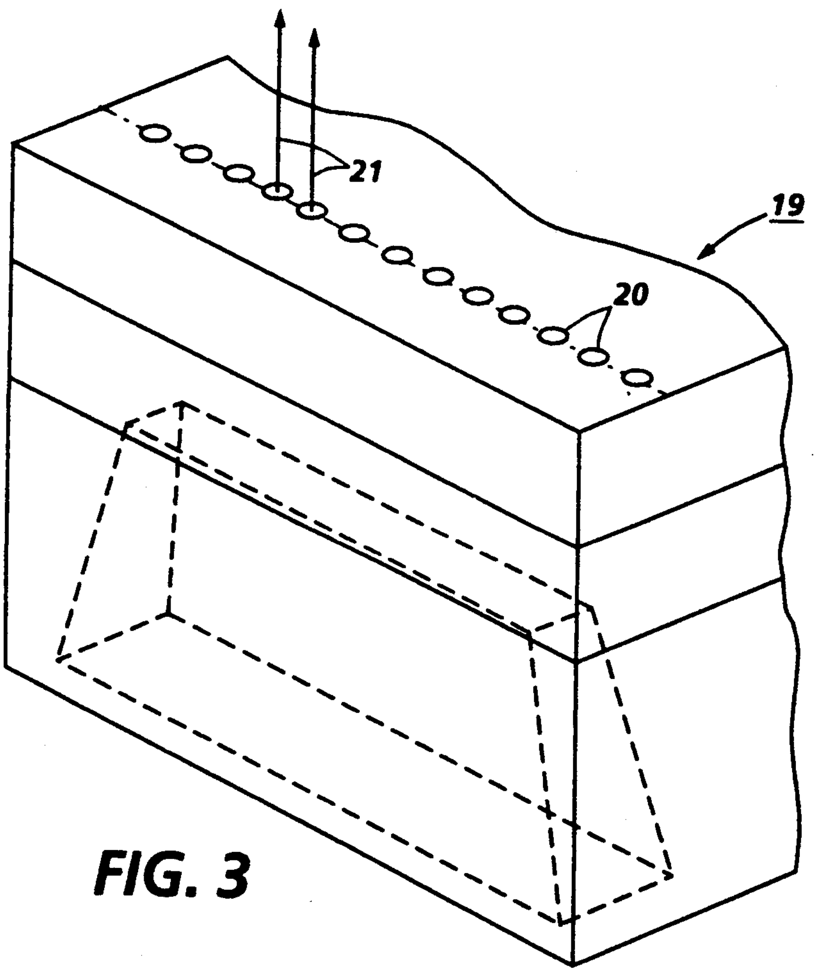
FIG. 3 is an isometric view of a printhead subunit having a roofshooter configuration.

An enlarged schematic front view of the pagewidth printbar 12A of the present invention is shown in FIG. 2. The printbar 12A is an array of individual printhead subunits 18. Any known method may be used to fabricate the individual printhead subunits 18. One example is U.S. Pat. No. Re. 32,572 to Hawkins et al., incorporated herein by reference. In general, printhead subunits are derived from two aligned and bonded silicon wafers, one wafer containing arrays of heating elements and addressing electrodes, and the other wafer containing arrays of recesses that are used as sets of channels and associated reservoirs. After bonding, the wafers are diced to form the printheads or printhead subunits that combine in an array of abutted subunits to form the printbar. One of the dicing cuts is perpendicularly across the channel opening the ends thereof to form the nozzles of the printhead subunits. Each of the printhead subunits has parallel opposing ends which are diced parallel to the channels, so that the distance between adjacent nozzles in two separately abutted printhead subunits is within the same predetermined adjacent distance as the nozzles in a single printhead subunit plus or minus the predetermined adjacent tolerance of plus or minus five micrometers. An alternative embodiment to a printbar with side nozzles is a printbar with roof nozzles. A printbar with roof nozzles is fabricated from printhead subunits having a "roofshooter" configuration. A schematic isometric view of a roofshooter printhead 19 is shown in FIG. 3. The nozzles 20 shoot in a vertical direction normal to the heating elements (not shown) represented by arrow 21 towards the recording medium (not shown). In multicolor printers, roofshooter printbars are stacked side-by-side instead of one over another. Refer to U.S. Pat. No. 4,789,425 to Drake et al. for an example of roofshooter printhead fabrication. Like printheads, subunits for reading and/or writing bars, though fabricated by any known technique, are diced to have parallel ends that are abutted to each other, so that adjacent end elements on adjacent subunits are within the same spacing as adjacent elements on a subunit, plus or minus a predetermined tolerance. Many different types of bars for reading and/or writing exist and are intended to be encompassed within this invention. The word "element" is intended to encompass any reading and/or writing subpart of a subunit making up a pagewidth reading or writing bar.

Figure 4:
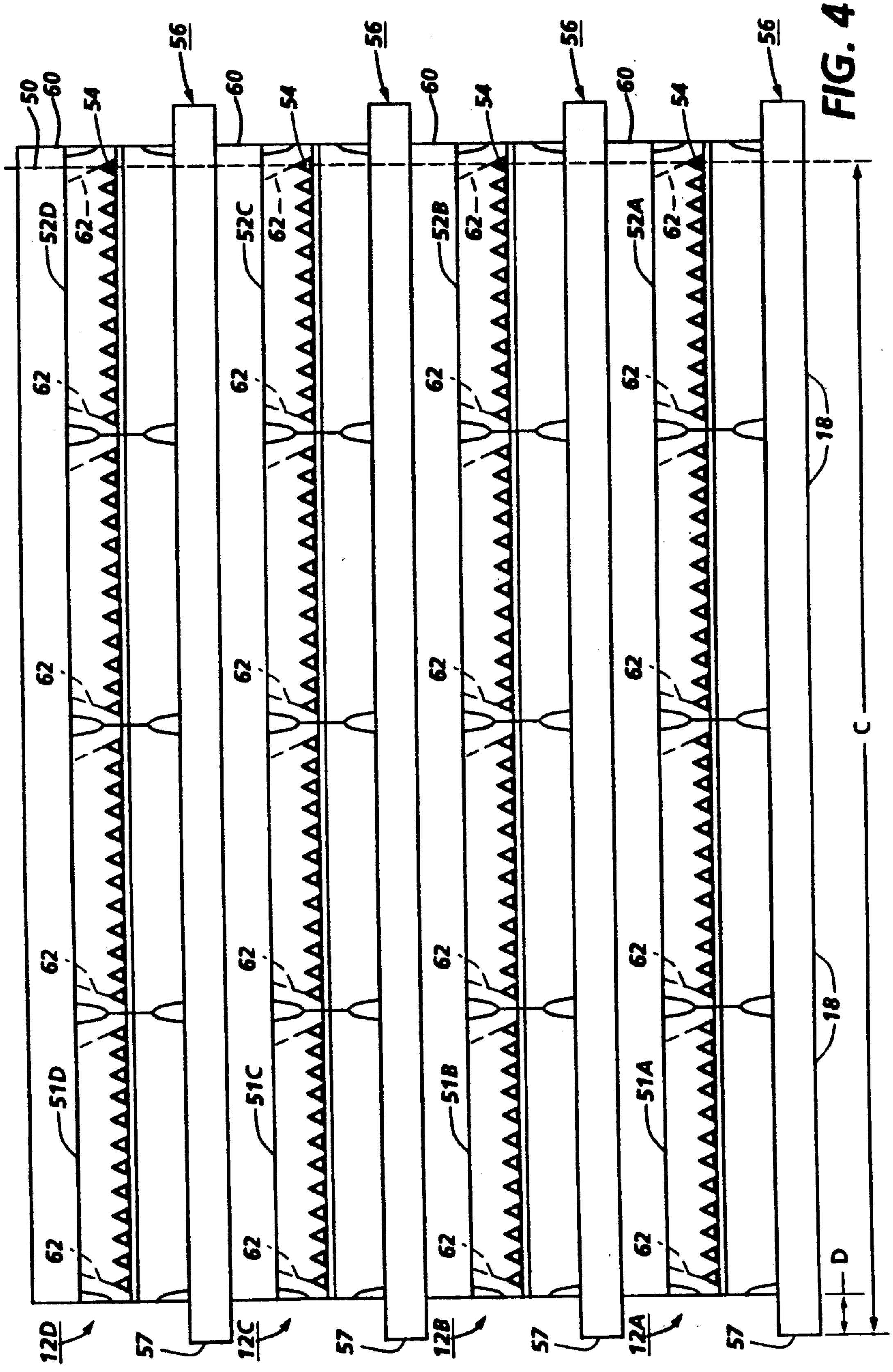
FIG. 4 is an enlarged, partially shown front view of all four stacked printbars of FIG. 1.

Precision alignment of the printheads is necessary because both black-on-black and color printing involve several different printbars sequentially propelling ink on the same target points or pixel locations on the paper. For example, FIG. 4 is an enlarged, partially shown front view of four stacked thermal ink jet printbars, 12A, 12B, 12C, 12D, one for each of the three primary colored inks and the other for black ink. Dashed line 50 represents the predetermined acceptable overall distance for the last nozzle 54 in each of the printhead subunits in the last position 52 in each printbar 12 from a location point, preferably the end 57 of structural member 56 which is opposite the last position 52, as indicated by dimension "C." This end of each structural member of the printbars 12 is then referenced by a multibar frame member (not shown) in the multicolor printer 10. Other location points could be used, such as, the first nozzle in the first printhead subunit in the first position 51 or its adjacent subunit edge located a fixed distance "D" from structural member end 57. The last nozzle of the printhead subunit in the last position must fall on line 50 or within its predetermined overall tolerance range in the preferred embodiment of plus or minus ten micrometers. If the ink jets or nozzles do not line up closely enough, then the mixed color images will be indistinct. Similarly, precision is required with multiple bars for any pagewidth reading and/or writing bars.

Figure 5:
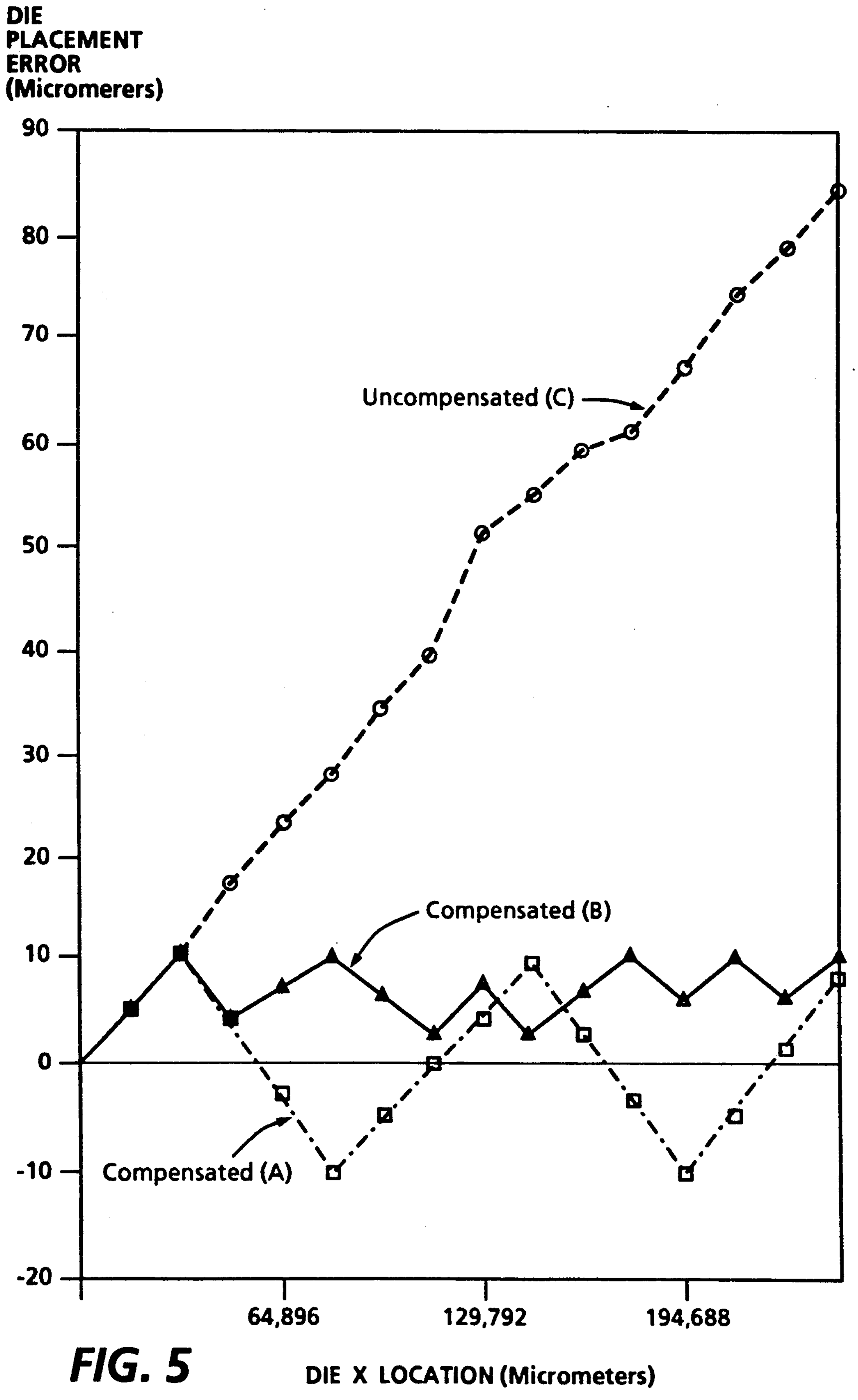
FIG. 5 is a graph of collinear die stackup error examples for uncompensated and compensated fabrication.

Because all printheads from the same set of wafers are generally the same size or within one micron of each other, if one is slightly shorter or longer than an ideal length, they all will be. Thus, stackup of tolerances will result when printhead subunits from only one set and size are abutted to form the printbar. By tolerance stackup, it is meant that the permissible dimensional shortfall or extension in the length of the printhead subunit array from the ideal length of the printhead subunit array will accumulate as each subunit is abuttingly added to the linear array of subunits to build a pagewidth printbar. For example, a graph illustrating collinear die stackup error in an uncompensated fabrication process is shown in FIG. 5, discussed later. One important part of printbar manufacture is, therefore, controlling the printhead subunit size. In the preferred embodiment, the majority of the printhead subunits are cut as close as possible to an ideal length. Other subunits are cut to different predetermined lengths, some longer and some shorter, than the ideal length, so that, as discussed later, they may be used to compensate for any error from the "ideal" printhead subunits not being the ideal length, with one useful set of dimensions for another supply being five micrometers over or under. An alternate embodiment uses only two lengths of printhead subunits, some longer and others shorter than an ideal size, and does not attempt to cut to the ideal size. The cutting of different sizes can be either intentional or unintentional. With an unintentional cutting system, the cutter attempts to dice subunits to an ideal length, and a typical measuring device (not shown) then determines the actual length and identifies any subunits that are longer or shorter than the ideal range, so that the measured subunits may be sorted into various predetermined supplies. Refer to FIG. 5 for graphs illustrating the effect of compensation on reducing the stackup error. The different approaches to compensation will be more specifically discussed hereinafter with respect to stackup error.

The present invention requires the dicing of printhead subunits 18 with different lengths. A preferred, useful difference between the lengths of two of the subunit supplies is about five micrometers. This difference corresponds to the preferred adjacent tolerance between two adjacent end nozzles of adjacently abutted subunits. Likewise, for reading and writing bars an appropriate length differential would correspond to the adjacent tolerance.

At least two supplies of printhead subunits (and preferably three) having predetermined lengths are provided. One of the supplies should be designated as the first supply (not shown) from which printheads will be first selected for mounting. The preferred embodiment uses, as the first supply, the printhead subunits of an ideal length, and each of the supplies of subunits are arranged upside down in rows and columns on a sheet or flat substrate (not shown). Referring to FIG. 2, a robot (not shown) moves a first printhead subunit 40 from the first supply of printhead subunits arranged on a sheet by, for example, a vacuum pickup to the alignment fixture 24 by any appropriate process. A vacuum arrangement (not shown) located below the alignment fixture is helpful for keeping the printhead subunits mounted thereon in position. Under the preferred embodiment, the first printhead subunit is placed into contact with surfaces 32 and 34 of the alignment fixture. Alternatively, other methods of locating the first subunit could be used. For example, the vacuum hold could be strong enough that surface 32 is not needed. By example, a video camera on the robot arm provides the robot with a way of locating the printhead subunits, and the robot lifts the printhead subunits with a vacuum gripper one at a time, from the sheet of ideal subunits and places them upside down in an end-to-end relationship on the alignment fixture. One example of using a robot and camera to move different types of chips is provided in U.S. Pat. No. 4,980,181 to Bartschat et al., though this patent does not disclose abutting a linear array of subunits.

After the placement of the first printhead subunit 40, a second video camera (not shown) captures the image of the printhead abutting surface 32 of the alignment fixture, and a computer (not shown) then finds and measures the distance "A" between the contact point of end surface 28 of the printhead subunit with the surface 32 and the center or tip of the first triangular shaped nozzle 30 of the first subunit 40 and may be measured from surface 32 or from surface 35 which is known fixed distance D from surface 32. When surface 35 is used, distance A is determined by subtracting distance D from measured distance "$C_1$". If no surface 32 was used for positioning the first subunit, the camera could still monitor the position of the first printhead subunit and its nozzle by using a reference point 25 on the alignment fixture which represent surfaces 32 or 35. The distance A should be approximately one half the distance between two adjacent nozzles on a single printhead subunit. For example, if the printbar subunit had 300 nozzles per inch, the distance should be approximately 43 micrometers, plus or minus a first tolerance of 3 micrometers. Various options are available if the distance is not within the appropriate limits. For example, the robot can either compensate for an out-of-tolerance error by selecting a longer or shorter printhead subunit, whichever appropriate, to mount next, or the robot can remove the original printhead subunit, replace it with another one, and again check the distance between the surface 32 or 35 and the center of the first nozzle 30 in the first subunit 40 and determine if dimension A is acceptable or not. The robot's course of action might appropriately be programmed to depend on the degree of error in the distance between the contact point, which represents subunits end surface 28, and the first nozzle 30. Monitoring a first subunit on a reading or writing bar other than an ink jet printer involves an equivalent process. With ink jet technology, because the distance between the nozzles on each printhead subunit is relatively constant, an alternate equivalent method of measurement may be made between the end surface 28 or alignment fixture surface 32 and any nozzle with an identified position on the first printhead subunit. Additionally, an alternative to measuring from the alignment fixture surface 32 or reference point 25 therefor could be measuring from another position on the alignment fixture, since accurately placed reference points or marks have been placed across an edge surface 27 for convenient viewing by the second video camera.

The robot then continues to mount printhead subunits one after the other. As each printhead subunit is abutted against a previously mounted subunit, two tolerances are checked by a computer system (not shown) and the second camera (not shown) that moves along a track (not shown) parallel to the alignment fixture 24. The distance "B" between the last nozzle 36 of the next-to-last mounted printhead subunit 42 and the first nozzle 38 of the last mounted printhead subunit 44 should be approximately equal to the distance between two adjacent nozzles on a single printhead subunit plus or minus the predetermined adjacent tolerance. Although a direct measurement between the last nozzle of the next-to-last printhead subunit and the adjacent first nozzle of the last printhead subunit may be made, the preferred method measures each nozzle from the original reference point (i.e., surface 35 or 32 of the alignment fixture 24) and subtracts the two measurements for the distance B. In the preferred method, the measurement of the position of the last nozzle of the next-to-last mounted printhead subunit is made as a first measurement point "$C_2$" and the measurement of the first nozzle of the last mounted printhead subunit is made as a second measurement point "$C_3$" and the distance between them obtained by subtraction by the computer system. Because the distance between nozzles on single printhead subunits is uniform, other nozzles with identified positions or portions of the printhead subunit could be used as measurement points followed by additions or subtractions by the computer system. The preferred embodiment uses an adjacent tolerance of plus or minus five micrometers. This value represents one half of the distance of an experimentally determined region within which the ink from adjacent printhead subunits must contact the paper for each target point or pixel and provides for the possibility that the nozzle may not fire perfectly straight. If the distance between adjacent printhead subunits is not within the permissible limits, then the last mounted printhead subunit 44 is replaced and the distance between nozzles of adjacent printhead subunits is again monitored. If the distance is still not within tolerable limits, there is probably an error with the next-to-last mounted printhead subunit 42, so under the preferred embodiment, both subunits are removed and a new printhead subunit is inserted and monitored in the former position of the next-to-last printhead subunit. Then the tolerances of the new printhead subunit would be measured. A similar process of mounting and measuring distances between elements of adjacent subunits applies in reading and/or writing bar technology.

The system checks for stackup error by determining the difference between the printhead subunit position's predetermined appropriate overall distance and the actual distance "C" between a location point such as the first printhead subunit surface 28 adjacent the alignment fixture surface 32 or surface 35 and a registration point such as the center of the last nozzle of the last mounted printhead subunit. Again, alternative registration points from the preferred embodiment may be used, so long as the distance "B" between adjacent end nozzles in separate, abutted subunits remains within the predetermined tolerance and the overall accumulative or stackup tolerance at any distance "C" is within a predetermined tolerance for a pagewidth printbar. Possibilities include a mark 25 on the alignment fixture, the first nozzle 30 of the first mounted printhead subunit, or any identified nozzle of the first mounted printhead subunit 40 for the location point and the first nozzle of the last mounted printhead subunit 44, any other identified nozzle of the last mounted printhead, or the far edge of the last mounted printhead subunit for the registration point. For a multicolor printer, the preferred assembly method would use surface 35 of alignment fixture 24 as the location point from which all other locations on the printbar 12 being assembled would be measured.

Several different options are available if a stackup error is beyond the stackup tolerance level. The robot could replace the last mounted printhead subunit with another from a more appropriate supply; i.e., from the sheet of shorter subunits or the sheet of longer subunits. Alternatively, the robot could leave the last mounted printhead subunit in place and simply use the measured information to decide which supply to draw the next printhead subunit from, the shorter or longer subunits. Still another approach would be to allow the computer to determine which course of action is more appropriate for each particular situation. A closely related consideration is the selection of the stackup tolerance level. The preferred embodiment uses a tolerance value of ten micrometers, so that misplacement of a nozzle, because of stackup or accumulation of allowable tolerances per subunit in a printbar, coupled with some droplet misdirectionality will not exceed twenty five microns, a value that represents one half of the experimentally determined diameter of a printed droplet (i.e., spot or pixel) on the paper, so that no droplet will miss the ideal pixel center on the paper which will result in an unacceptable degree of distortion. Another approach might be to assign a variable tolerance value such as five microns plus the number of printhead subunits added so far. If the computer is designed to determine whether to replace the last mounted unit, then two different tolerances could be established, one for replacement of the last mounted subunit and the other to indicate that a different next printhead subunit should be used. The preferred embodiment replaces the last printhead subunit after the maximum tolerance of ten micrometers has actually been exceeded and does not use intermediate or preventative tolerances. It is believed that this approach is more efficient than trying to anticipate trouble with a precautionary tolerance level or system of levels. Similar procedures and options apply with respect to fabricating pagewidth reading and writing bars from subunits.

If, after the robot performs one of the above options to correct or compensate for the stackup, it is within the tolerance range, several options exist. Under the preferred embodiment, the robot continues to choose die from the supply used to correct or compensate the stackup error (i.e., the shorter or longer subunits) until it reaches a maximum error in the opposite direction. Then the robot and computer system follows the same process for correcting or compensating the most recent error to correct or compensate the stackup error in the other direction until again the maximum allowable out-of-tolerance range is exceeded, etc. This embodiment is illustrated by the plotted curve (A) for Compensated die placement error in the graph of FIG. 5. This technique is especially appropriate when the design involves only two supplies of printhead subunits. Note that the range of tolerance correction is within the range of plus or minus ten micrometers and stackup error in one direction is permitted until the maximum or minimum stackup error is reached. Under another embodiment, as soon as the stackup is within the tolerance range, the robot draws printhead subunits from the same supply as the first mounted subunit. This embodiment is illustrated by the plotted curve (B) for Compensated die placement error. It is more appropriate when the design involves three or more supplies of printhead subunits with at least one supply being approximately an ideal length. A variation between these embodiments would be for the robot to continue to choose die from the supply used to correct or compensate the first measured stackup error until it reaches a maximum error in the opposite direction and to then use the subunits from the ideal supply. For example, if the ideal supply was slightly too long, the first tolerance error would be in the positive direction. This could be corrected with shorter subunits until the error reached or approached the maximum error permitted in the negative direction. Then, because the ideal subunits are not as long as the longer subunits, using the ideal subunits would prevent the error from again exceeding its tolerance as quickly as if the robot used longer subunits. Many other embodiments (not shown) relating to variations in choosing between supplies of subunits would also be appropriate and within the scope of this invention. For illustration purposes, the stackup error is plotted in curve (C) from a single supply of subunits which are slightly larger than ideal, but well within the allowable tolerance for subunit length.

After the array is completed, a structural member or bar 56 is affixed thereto with epoxy 58, as shown in FIG. 2. All of the subunits are positioned on the alignment fixture upside down and the structural bar is coated on one surface with an epoxy prior to being lowered onto the assembled subunits held in place on the alignment fixture 24 by a vacuum applied through holes or slots therein (not shown). Four stacked bars are shown in FIG. 4 along with the ink supply manifolds 60 that are attached to the printbars 12A, 12B, 12C, and 12D, so that the appropriately colored ink can be supplied to the inlets 62 of the printhead subunits shown in dashed line.

In recapitulation, this invention relates to a method of controlling stackup error in the fabrication process for a pagewidth linear array of reading and/or writing subunits. Multiple lengths of subunits are diced and placed in corresponding flat containers. An assembly robot places the subunits in a butted array. A monitoring system determines whether the distance between the last element on the next-to-last mounted subunit and the first element on the last mounted subunit is within an acceptable range. If not, subunits are replaced until the range is acceptable. The monitoring system also determines the stackup error by subtracting the distance between the last element of the last mounted subunit and a reference point, such as the a reference point or contact surface of the alignment bar, from a predetermined overall distance. If the stackup error falls outside the acceptable range, then the last mounted subunit may be replaced and/or an appropriate subunit from another supply of differently sized subunits may be used as the next subunit.

Many modifications and variations are apparent from the foregoing description of the invention and all such modifications and variations are intended to be within the scope of the present invention.

We claim:

1. A method for fabricating a pagewidth linear array for use as a pixel reading and/or writing bar, the array being assembled by the end-to-end abutment of subunits, each subunit having a plurality of equally spaced, linearly arranged discrete reading and/or writing elements, comprising the steps of:

(a) providing at least two supplies of substantially identical fully functional subunits having opposing ends wherein said supplies comprise
  (i) a supply of shorter subunits having a predetermined shorter length plus or minus a predetermined tolerance and
  (ii) a supply of longer subunits having a predetermined longer length plus or minus a predetermined tolerance, wherein said predetermined shorter length is smaller than said predetermined longer length by a predetermined amount;
(b) mounting a first subunit from a selected one of the supplies on an alignment fixture and in alignment with a predetermined location point on said fixture;
(c) mounting additional subunits one at a time on the alignment fixture in an end-to-end abutting relationship until the array is completed with a final subunit;
(d) measuring the distance between the location point on the alignment fixture and a registration point on each subunit immediately after it is mounted on said fixture and before a next subunit is mounted;
(e) determining a stackup error by comparing the measured distance between the location point on the alignment fixture and the registration point on the last mounted subunit with a desired distance; and
(f) correcting the stackup error if the stackup error is outside a range of plus or minus a predetermined tolerance stackup from said desired distance by replacing the last mounted subunit with a subunit selected from one of said supplies other than the supply from which said last mounted subunit was selected.

2. The method of claim 1, wherein each of the subunit ends are parallel and designed so that the distance between adjacent elements in two separately abutted subunits is within the same predetermined adjacent distance as the elements in a single subunit plus or minus a predetermined adjacent tolerance; and wherein one end of the first subunit mounted is aligned with the location point on said fixture.

3. The method of claim 2, wherein the location point comprises a predetermined reference point inscribed on the alignment fixture.

4. The method of claim 2, wherein the location point on the alignment fixture comprises a contact surface thereof in which the aligned first subunit end is placed in contact therewith.

5. The method of claim 4, wherein the method further comprises:

(g) repeating steps (c) through (e), but continuing to choose subunits from the supply last used in step (f) to correct the stackup error until the current stackup error is again outside the range of plus or minus the predetermined amount from said desired distance in the opposite direction from the previously corrected stackup error; and
(h) repeating steps (f) and (g) to correct the current stackup error until the array is completed with a final subunit.

6. The method of claim 4, further comprising the step of providing a supply of substantially identical fully functional ideal subunits having opposing ends, wherein said ideal subunits have a predetermined ideal length plus or minus a predetermined tolerance and said ideal length is intermediate said shorter and longer lengths.

7. The method of claim 6, wherein the selected supply of subunits in step (b) is the supply of subunits with the ideal length and step (f) further comprises:

(i) choosing the appropriate subunit to correct the stackup error by selecting the replacement subunit from either the supply of shorter subunits or the supply of longer subunits, so that the stackup error is within the range of plus or minus the predetermined amount from said desired distance;
(j) then repeating steps (c) through (e) choosing subunits from the supply of subunits with the ideal length until the current stackup error is outside the range of plus or minus the predetermined amount from said desired distance; and
(k) repeating step (f) to correct the current stackup error when it is outside the range of plus or minus the predetermined amount from said desired distance.

8. The method of claim 6, wherein the selected supply of subunits in step (b) is the supply of subunits with the ideal length and step (f) further comprises:

(l) choosing the appropriate subunit to correct the stackup error by selecting the replacement subunit from either the supply of shorter subunits or the supply of longer subunits and continuing to choose subunits from the supply used to correct the stackup error until the current stackup error is outside the range of plus or minus the predetermined amount from the desired distance in the opposite direction from the previously corrected stackup error;
(m) repeating step (f) to correct the stackup error, then choosing subunits from the supply of subunits with the desired length during steps (c) through (e) until the current stackup error is outside the range of plus or minus the predetermined amount from said desired distance; and
(n) repeating step (f) to correct the current stackup error when the current stackup error is outside the range of plus or minus the predetermined amount from said desired distance until the array is completed with a final subunit.

9. The method of claim 6, wherein the registration point on the subunits comprises the element of the last mounted subunit which is farthest from the contact surface on the alignment fixture.

10. The method of claim 9, wherein the subunits are fully functional printhead subunits with an array of nozzles on its roof; and wherein the elements are the nozzles.

11. The method of claim 9, wherein the subunits are fully functional printhead subunits with an array of nozzles on its edge or side; and wherein the elements are the nozzles.

12. The method of claim 11, wherein step (b) further comprises:

(o) measuring the distance between the contact surface on the alignment fixture and a selected one of the nozzles with an identified position on the first mounted printhead subunit;

(p) comparing the measured distance between the contact surface on the alignment fixture and the selected nozzle on the first mounted printhead subunit with a desired distance A; and (q) if the measured distance is outside a range of plus or minus a predetermined tolerance, replacing the printhead subunit with another one from the supplies of printhead subunits until one is within said predetermined tolerance.

13. The method of claim 12, wherein the step (q) of replacing the first printhead subunits comprises the steps of:

removing the first mounted printhead subunit;

mounting a replacement first mounted printhead subunit; and repeating the process of measuring, comparing, and replacing the first mounted printhead subunit until the distance A between the contact surface on the alignment fixture and the selected nozzle on the first mounted printhead subunit is within said predetermined tolerance.

14. The method of claim 12, wherein the step (q) of replacing the first mounted printhead subunit further comprises:

(r) only replacing one printhead subunit, followed by selecting an appropriate printhead subunit to be mounted next from another supply in accordance with step (f), thereby waiving said predetermined tolerance for distance A.

15. The method of claim 11, wherein step (d) further comprises:

(s) measuring the distance between the contact surface of the alignment fixture and the last nozzle on the next-to-last mounted printhead subunit and the distance between the contact surface of the alignment and the first nozzle on the last mounted printhead subunit;

(t) subtracting the two measurements to obtain distance B which represents the distance between the last nozzle of the next-to-last mounted printhead subunit and the adjacent first nozzle of the last mounted printhead subunit;

(u) comparing the measured distance B with a desired predetermined distance;

(v) replacing the last mounted printhead subunit with another printhead subunit from a different supply, if measured distance B is outside a range of plus or minus the predetermined adjacent tolerance from the predetermined adjacent distance; and (w) repeating steps (s) through (v) until measured distance B is within the range of plus or minus the predetermined adjacent tolerance.

16. The method of claim 15, wherein the means for measuring in step (s) is a video camera and computer.

17. The method of claim 15, wherein a robot mounts and removes the subunits.

18. The method of claim 15, wherein the predetermined amount from said desired distance is within ten micrometers.

19. The method of claim 15, wherein the predetermined adjacent tolerance is five micrometers.

20. The method of claim 11, wherein the length of one supply of functional longer, printhead subunits is approximately five micrometers longer than the ideal length and the length of one supply of functional shorter printhead subunits is approximately five micrometers shorter than the ideal length.

21. The method of claim 20, wherein the method further comprises the steps of:

(x) applying a layer of adhesive to a surface of an elongated structural member having a predetermined length which is longer than the pagewidth array of printhead subunits;

(y) aligning, mating and bonding the structural member with the array of printhead subunits mounted on the alignment fixture with the layer of adhesive therebetween; and (z) curing the adhesive and removing the pagewidth in jet printhead array from the alignment fixture.

22. The method of claim 21, wherein the method further comprises mounting an ink supply manifold to the printhead array on the side of the abutted printhead subunits opposite the one bonded to the structural member.

23. A method for fabricating a pagewidth linear array for use as a printbar, the array being assembled by the end-to-end abutment of fully functional printhead subunits, each subunit having a plurality of equally spaced, linearly arranged discrete nozzles, comprising the steps of:

(a) providing at least one supply of substantially identical fully functional longer printhead subunits, each having opposing ends adopted for abutment with each other, the distance between opposing ends of each printhead subunit being within a predetermined distance plus or minus a predetermined tolerance, so that the distance between adjacent nozzles in two separately abutted printhead subunits are within the same spacing as the nozzles in the printhead subunits plus or minus the predetermined tolerance.

(b) providing at least one supply of fully functional shorter printhead subunits that are substantially identical to the longer printhead subunits, except for the distance between opposing ends which is slightly smaller than the distance between the opposing ends of the longer printhead subunits by at least a predetermined amount;

(c) mounting a first printhead subunit from one of the supplies with one end on a contact surface of an alignment fixture;

(d) mounting a second printhead subunit from the same supply as the first printhead subunit on the alignment fixture in an end-to-end abutting relationship with the first printhead subunit;

(e) measuring the distance of the last nozzle of a last mounted printhead subunit from the contact surface on the alignment fixture before a next printhead subunit is mounted;

(f) comparing the measured distance between the last nozzle of the last mounted printhead subunit from the contact surface on the alignment fixture with a desired distance;

(g) mounting only printhead subunits from the same supply as the last mounted printhead subunit until the distance separating the contact surface of the alignment fixture and the last nozzle of the last mounted printhead subunit is outside a range of plus or minus a predetermined stackup error from said desired distance;

(h) replacing the last mounted printhead subunit with a printhead subunit from the other supply only if the measured distance exceeds a range of plus or minus a predetermined stackup error from the desired distance;

(i) repeating steps (e) through (g) after each printhead is abuttingly mounted on the alignment fixture; and (j) continually mounting printheads until the pagewidth array is completed with a final printhead subunit which is within the range of plus or minus the predetermined stackup error from said desired distance.

* * * * *